(No Model.)
W. C. DUNN.
GAME.
No. 384,240. Patented June 12, 1888.
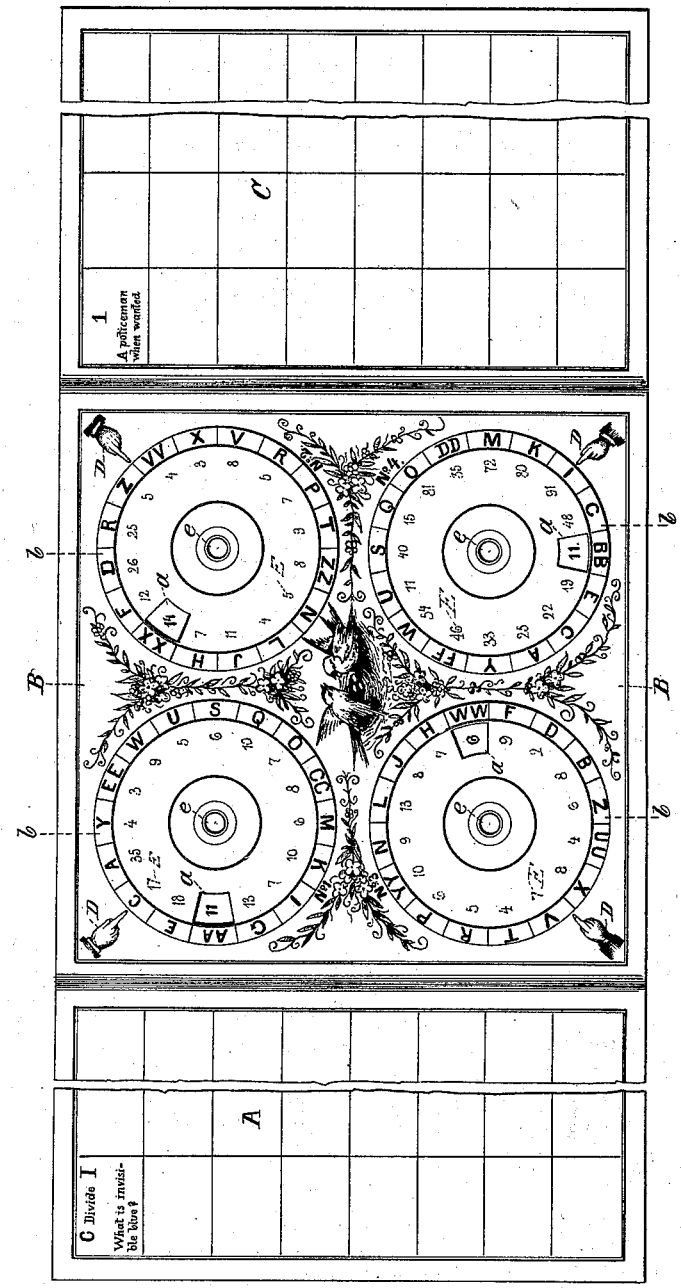
WITNESSES:
Bruno von Biltzingsloven.
C. E. McDonald
INVENTOR,
William C. Dunn.
BY
Singer & Ebner,
ATTORNEY.

United States Patent Office.

WILLIAM C. DUNN, OF NEW YORK, N. Y.

GAME.

SPECIFICATION forming part of Letters Patent No. 384,240, dated June 12, 1888.

Application filed January 27, 1888. Serial No. 262,111. (No model.)

*To all whom it may concern:*

Be it known that I, WILLIAM C. DUNN, a citizen of the United States, residing at the city of New York, in the county of New York and State of New York, have invented a new and useful Improvement in Games, of which the following is a specification.

My invention relates to that class of games in which it is necessary for the player in carrying on the game to solve an arithmetical problem, and in which instruction may be blended with amusement.

The nature of the invention consists in the combination of disks revoluble about their centers, a radial slot in each disk, and a border on the outer edge of each disk divided into equal spaces, and each space containing a symbol, with a sheet of suitable material having a plane surface, to which said revoluble disks are attached, a series of numbers inscribed in circles upon said plane surface, so that when said disks are turned said numbers may be successively seen through said slots, index-hands enstamped upon said plane surface—one for each disk—without the perimeter of said disk and pointing to the center thereof, two leaves of equal size having plane surfaces and flexibly attached by one edge each to an opposite side of said plane-surfaced sheet, so as to fold thereon, a series of equal spaces marked upon the inner side of each leaf, a pair of symbols and a question enstamped within said spaces upon one leaf, and a series of numbers and answers enstamped within the spaces upon the other leaf, and the said pairs of symbols so arranged with regard to the symbols in the said revoluble disks that when the corresponding symbols upon two of said disks are set opposite the said index-hands a number corresponding to each disk may be seen through the slot thereof, which numbers constitute an arithmetical problem, the solution of which gives the number of the answer to the question enstamped with said pair of symbols upon one of said leaves, which number and corresponding answer are enstamped, as aforesaid, upon the other leaf.

The nature of the invention also consists in the details of combination and arrangement substantially as illustrated in the drawing, hereinafter described, and subsequently pointed out in the claims.

The object of the invention is to produce a game which will blend light amusement with solid and useful instruction.

The drawing shows a plan view of the device.

In the drawing, B designates a sheet of any suitable material—such as card-board, celluloid, metal, wood, or the like—having a plane surface. Upon this surface are enstamped the four index-hands D D D D—one in each corner. Upon this plane surface are also printed four circles of numbers, E E E E. To the centers *e e e e* of these circles, and upon said plane surface over said circles of figures, are attached the revoluble disks 1, 2, 3, and 4. Each number in the circles E under each disk can be seen in succession through the slot *a* as the disk is turned. Upon the outer edge of each of these disks is a border, *b*, divided into equal spaces and each space marked with a symbol. In the example given these symbols consist of letters; but they may be any other characters, figures, pictures, or designs that may be desired. To the edges of this plane-surfaced sheet B are flexibly attached the leaves A and C, each by one edge, and one on either side of said sheet B. The inner surface of each of these leaves is divided by lines into equal rectangular spaces. In the example given the spaces upon the leaf A contain symbols in pairs and questions. These symbols correspond to the symbols on the disks, so that if one disk be turned until the one of these symbols upon that disk comes opposite the index-hand D a certain number in the circle below that disk will be visible through the slot *a*. Then if another disk be turned until the other symbol in said pair and upon said disk comes opposite the index-hand D of that disk another number will be visible through the slot *a* of that disk. These two numbers constitute an arithmetical problem. The way it is to be solved is indicated by the word between the pair of symbols on the leaf A. When the problem is solved, its solution will give the number of the answer to the question in the space with the pair of symbols on the sheet A, and this number and answer will be found in one of the spaces upon the sheet C.

It is obvious that an infinite number of questions involving an infinite number of arithmetical problems, and an infinite variety of answers which will afford great interest, amusement, and instruction to the players, may thus be arranged, so that the players while they thus amuse themselves may be learning many interesting and useful things.

What I claim as my invention, and desire to secure by Letters Patent, is—

1. The combination of disks revoluble about their centers, a radial slot in each disk, and a border on the outer edge of each disk divided into equal spaces and each space containing a symbol, with a sheet of suitable material having a plane surface, to which said revoluble disks are attached, series of numbers inscribed in circles upon said plane surface, so that when said disks are turned said numbers may be successively seen through said slots, index-hands enstamped upon said plane surface—one for each disk—outside the perimeter of said disk and pointing to the center thereof, two leaves of equal size having plane surfaces and flexibly attached by one edge each to an opposite side of said plane surfaced sheet, so as to fold thereon, a series of equal spaces marked upon the inner side of each leaf, a pair of symbols and a question enstamped within each of said spaces upon one leaf, and a series of numbers and answers enstamped within the spaces upon the other leaf, and the said pairs of symbols so arranged with regard to the symbols on the said revoluble disks that when the corresponding symbols upon two of said disks are set opposite the said index-hands a number corresponding to each disk may be seen through the slot thereof, which numbers constitute an arithmetical problem, the solution of which gives the number of the answer to the question enstamped, as aforesaid, with said pair of symbols upon one of said leaves, which number and answer are enstamped, as aforesaid, upon the other leaf, substantially as and for the purpose set forth.

2. The combination of the disks 1, 2, 3, and 4, the slots $a$ of said disks, and the border $b$ thereof, divided and marked with symbols, as specified, with the plane-surfaced sheet B, to which the disks 1 2 3 4 are revolubly attached by their centers $e\ e\ e\ e$, the circles of numbers E E E E, inscribed, as aforesaid, upon said sheet B, the index-hands D D D D, also enstamped thereon, the leaves A and C, flexibly attached to said sheet B, and each divided into spaces and enstamped, as specified, all substantially as and for the purpose set forth.

In witness whereof I hereunto set my hand in presence of two witnesses.

WM. C. DUNN.

Witnesses:
BRUNO VON BÜLTZINGSLÖWEN,
C. E. McDONALD.